United States Patent [19]

Gleizes

[11] 4,216,894
[45] Aug. 12, 1980

[54] PORTABLE SOLDERING APPARATUS

[76] Inventor: Raymond M. X. Gleizes, 10, rue Pasteur, 77300 Fontainebleau, France

[21] Appl. No.: 925,760

[22] Filed: Jul. 18, 1978

[30] Foreign Application Priority Data

Jul. 9, 1977 [FR] France ................. 77 22049

[51] Int. Cl.² .................... B23K 3/02; B23K 3/06
[52] U.S. Cl. ........................... 228/52; 228/41; 221/266; 222/363
[58] Field of Search .................. 228/52, 53, 41; 219/421, 230; 221/266; 222/363

[56] References Cited

U.S. PATENT DOCUMENTS

| | | | |
|---|---|---|---|
| 1,061,170 | 5/1913 | Giffen | 228/53 |
| 1,517,952 | 12/1924 | Capparella | 221/266 |
| 1,691,052 | 11/1928 | Fay | 228/52 |
| 2,447,110 | 8/1948 | Bitzenburger | 228/52 |
| 2,562,666 | 7/1951 | Gustafson et al. | 221/266 |
| 2,579,549 | 12/1951 | Cave | 222/363 |
| 3,146,747 | 9/1964 | Stebbing, Jr. | 228/53 |

FOREIGN PATENT DOCUMENTS 562094 10/1932 Fed. Rep. of Germany ............ 228/52
481669 3/1938 United Kingdom ................. 219/230

*Primary Examiner*—Daniel C. Crane
*Attorney, Agent, or Firm*—Fleit & Jacobson

[57] ABSTRACT

An improved soldering device has a magazine to hold preformed solder shapes for dispensing them through a tubular duct onto a channel formed in a soldering bit. The channel leads to an opening formed in the bit to permit passage therethrough of the preformed solder shapes. An actuator is affixed to the magazine to dispense the preformed solder shapes one at a time. The preformed solder shapes do not become molten until passing through the opening in the bit.

8 Claims, 6 Drawing Figures

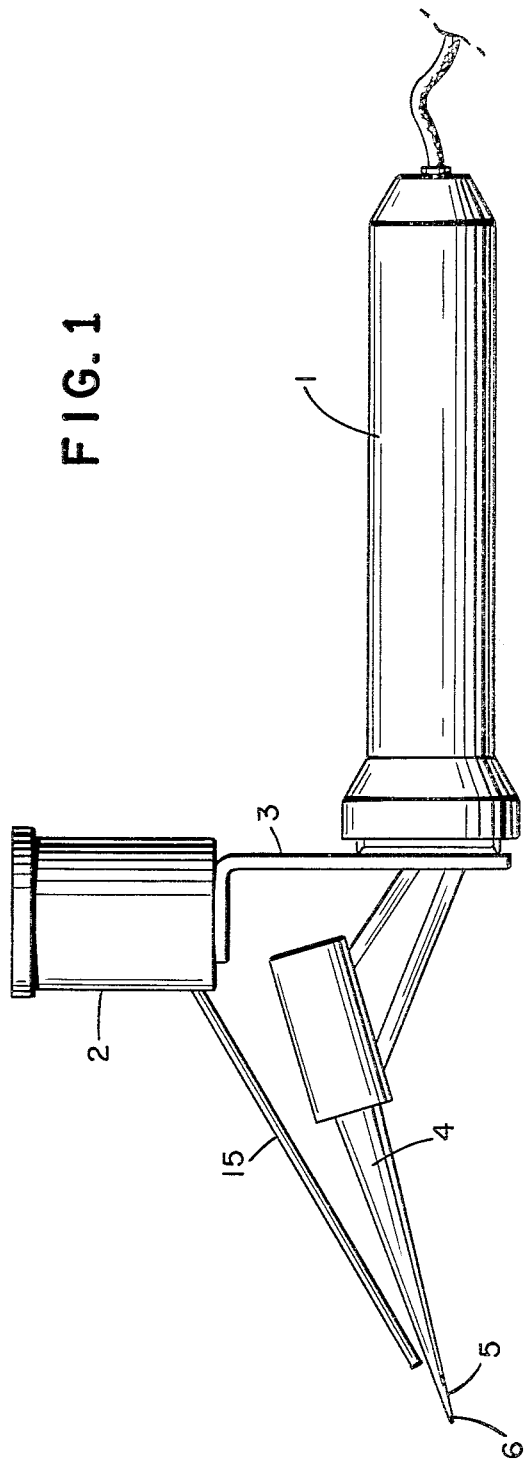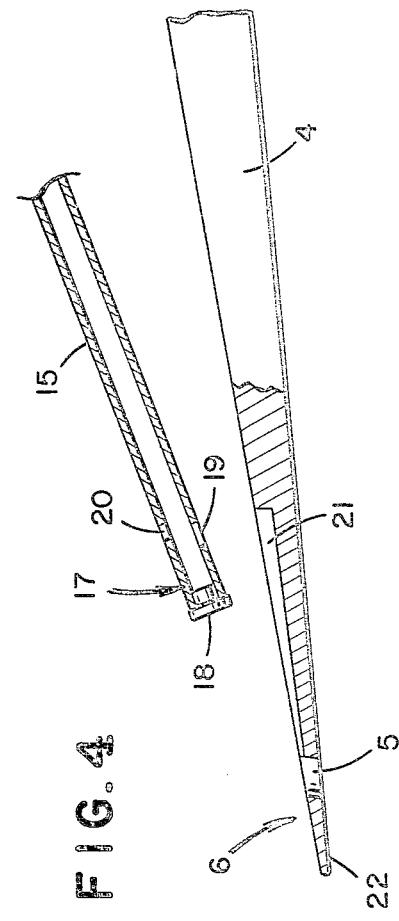

PORTABLE SOLDERING APPARATUS

The present invention relates to soldering apparatus and, more specifically, to a device which may be mounted on the body of a soldering iron or of other apparatus of an analogous nature, for the purpose of delivering the quantity of metal required for a soldering operation.

The term soldering, in the following description and claims, shall be understood to refer not only to soldering as such, but also to brazing.

When a professional or amateur wishes to solder two metal elements by means of a conventional soldering iron, he must hold the two elements in position and also grasp the soldering iron and supply the quantity of metal. As a rule, the user holds the soldering iron in one hand and the soldering wire, consisting of a variety of metals or alloys of lead and tin, in the other. Thus, the two elements which are to be soldered must be held in position by other means. This does not raise any great difficulties if the elements can be held by mechanical devices, for example clamps; most frequently, however, this is not the case and the retention in position of the two elements then presents the solderer with a problem which frequently cannot be overcome without assistance from another person.

Furthermore, the solderer may find it difficult to meter the quantity of metal he requires, and it is only after the soldering action has been completed that he can observe whether he has used too much or too little metal. This disadvantage is particularly serious if a series of identical soldering actions has to be performed. For example, in soldering conductor wires to the multiple lugs of a telephone relay, it is necessary not only to have sufficiently little metal for the wires to be visible amidst the soldered joints, but also that all the soldered joints should be as identical as possible; the telephone relay may be rejected by the purchaser if this is not the case.

There are devices which may be installed on a soldering iron and which allow automatic supply of soldering wire to the soldering bit or small end, in particular by the application of rollers turning in opposed directions and between them entraining a soldering wire; a definite quantity of wire may then be delivered every time this device is set in motion. Devices of this kind certainly free one hand which may thus hold one of the elements to be soldered in position with respect to the other, directly or indirectly, for example by the application of pincers. However, these devices do not render it possible to control the quantity of solder deposited with sufficient care. Moreover, the operation of these devices demands an appreciable amount of force, which results in premature tiredness of the solderer.

It proved possible to contemplate eliminating these shortcomings by making use of preformed solder shapes such as beads, and this produced solder bead dispensing devices such as that described in U.S. Pat. No. 1,691,052. This device comprises a bead holder which, in its lower portion, incorporates a casing in which a toothed wheel is situated. The space defined by the casing and two consecutive teeth of the wheel has a volume barely greater than that of a bead. The toothed wheel is actuated by a detent system which is triggered by the user when he wishes to obtain a bead; the bead is fed into a guiding duct and is thus directed as far as the extremity of the soldering bit.

These solder dispensing devices have hardly given satisfaction until now, since they have numerous disadvantages. To mention but one, reference is made to the rapid soiling of the passage through which the preformed solder shapes are conveyed.

One of the objects of the present invention thus consists in providing a device which may be installed on soldering apparatus of any suitable kind, and whereof the bulk at the level of the soldering but does not exceed that of devices on the market at present.

Another object is to have such an apparatus which will remain operable for as long as possible.

A further object of the invention is to render the handling of an apparatus of this kind as untiring as possible for the user.

A further object of the invention is to be able to control the travel of the preformed solder shapes.

A further object of the invention is to provide an automatic and portable soldering apparatus which allows the user to hold the preformed shape in position during the actual soldering operation.

A further object is to allow the application of preformed solder shapes, such as beads of lead-tine alloy.

According to the present invention there is provided a soldering device for soldering by means of preformed solder shapes such as beads, the device comprising a soldering bit and a dispenser arranged to feed the preformed solder shapes to said soldering bit which, close to its free end, is formed with an opening dimensioned to allow through passage of the preformed solder shapes.

The dispenser device advantageously comprises a magazine for preformed solder shapes, an extractor for preformed solder shapes at the bottom of said magazine, means for actuating the extractor, and a conveying duct which opens at one end beneath the said extractor and opens at the other end close to the opening in said soldering bit.

In a preferred form, the extractor comprises a cylinder which is at the base of said magazine and which comprises a seat arranged to receive a predetermined quantity of preformed solder shapes and movable on its axis between an extraction position in which a predetermined quantity of preformed solder shapes occupies said seat, and a distribution position in which said quantity is delivered into said conveying duct. The cylinder may be formed with fins or webs projecting into the bottom of the magazine; upon rotation of the cylinder, these fins, by displacing the solder shapes in contact with them, prevent their settling at the bottom of the magazine, which would be deleterious to the satisfactory operation of the extractor.

The extremity of the conveying duct situated close to the opening in said soldering bit is plugged and said duct has a discharge orifice for preformed solder shapes situated a little before said plugged extremity and in alignment with the soldering bit. This conveying duct may moreover be provided with a vent which is diametrically opposed to the said discharge orifice and which is smaller in size than that of the preformed solder shapes used. Suitably, said soldering bit has cut into it, beneath said discharge orifice, a longitudinal channel which opens into said opening, and the width of said channel is at least equal to the greatest dimension of the preformed solder shapes used.

The means for actuating the extractor, which is a cylinder in the preferred form of embodiment, may comprise an angled trigger comprising a long limb and a short limb which between them have a bend hinged around a spindle mounted on the dispenser mounting, and a spiral spring coupled to said cylinder around which it is coiled and is connected to the free extremity of the long limb of said trigger.

This spiral spring advantageously has one end engaged in a slot within a groove in the outer portion of said cylinder and is hooked at its other extremity on the free end of said long limb.

The spindle around which the trigger or release is hinged is preferably equipped with two stops limiting the displacement of this trigger.

It will be appreciated that when the solderer wishes to provide the metal quantity required to produce a spot of solder, it is sufficient for him to press on the short limb of the trigger. He thus causes a rotation of the cylinder and the housing or seat containing a solder shape or a predetermined quantity of solder shapes, opens above the conveying duct. The shape or shapes is or are conveyed by gravity as far as the plugged extremity of the conveying duct, rebound and drop via the discharge orifice into the groove which guides them to the opening through which they pass. They are then in position below the useful portion of the small end, where they melt under the action of the heat dissipated by the bit, which renders it possible to produce a soldered joint.

The device is particularly applicable to use with spherical solder shapes, that is to say with beads which may moreover be produced in perfectly calibrated sizes.

An embodiment of the present invention will now be described, by way of example, with reference to the accompanying drawings. This embodiment relates to the case where the solder shapes are beads distributed separately, but it will be appreciated that the inventive dispensing device could easily be adapted for use with solder shapes of other kinds and/or such as are distributed in greater quantity at one time. In the accompanying drawings:

FIG. 1 is a side elevation showing a soldering device in accordance with the invention, installed on a soldering iron of a known type;

FIG. 4 is a detail section showing the small end of the bit of the soldering iron and the adjacent end of the dispensing duct for the solder shapes;

Figure 2:
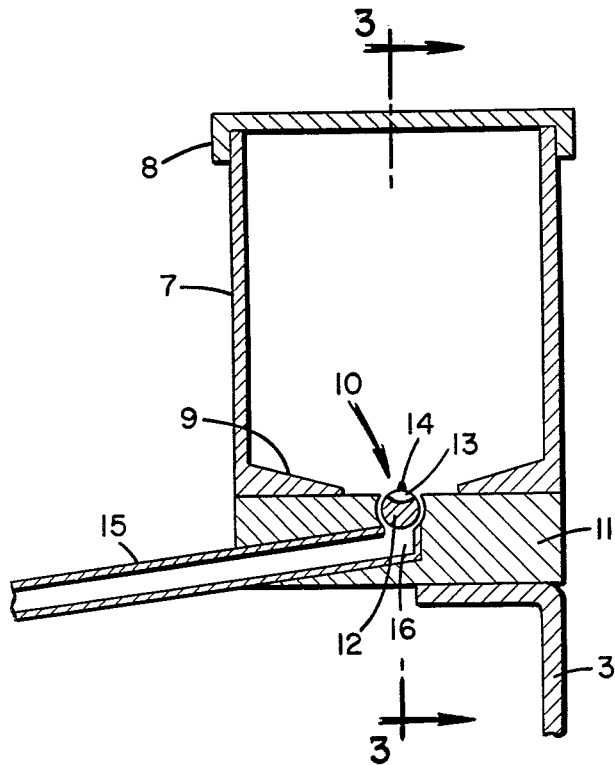
FIG. 2 is a sectional elevation illustrating the device.

Referring to FIG. 1 of the drawings, the barrel of a soldering iron 1 of known type is equipped with a device in accordance with the present invention, with a solder dispenser 2 for dispensing beads of solder and mounted via a bearer 3 on the soldering iron 1, and a soldering bit 4 having an opening 5 close to its free extremity or small end 6. The apparatus also comprises a conveying duct 15 which collects the beads at the outlet of the dispenser 2 and feeds them to a point above the bit 4.

Figure 3:
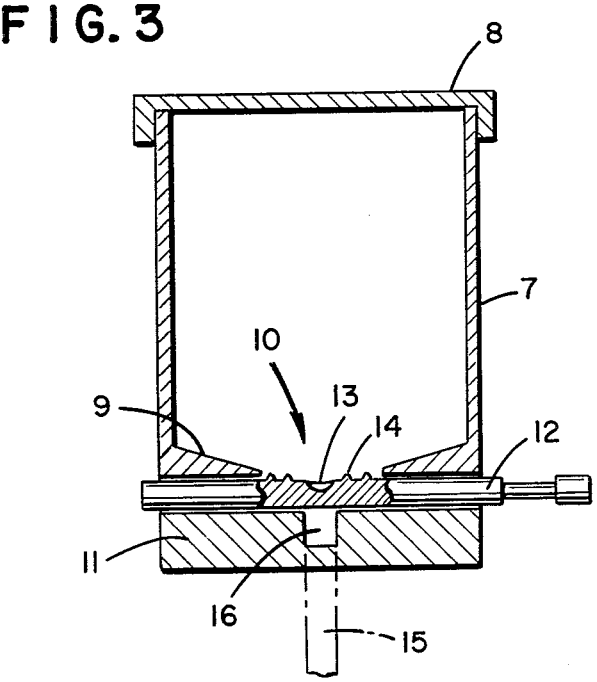
FIG. 3 is a section on the line AA of FIG. 2.

The dispenser 2 comprises a cylindrical magazine 7 (FIGS. 2 and 3) which is provided with a lid 8 and whereof the bottom part 9 is frusto-conical. At its base, this bottom part 9 has an opening 10. The magazine 7 is also provided with an outer base 11 which is screwed onto its bottom part.

In the upper portion of the outer base 11 is machined a space to allow the insertion of a cylinder 12 which provides a seat 13 and fins 14. The seat 13 is of such size that it may receive solder beads one only at a time.

In the idle or receiving position of the cylinder 12, which will be described below, the seat 13 is open at the top to the bottom part of the magazine 7, and the fins 14 project into the magazine.

In this embodiment, the conveying duct 15 penetrates into the outer or false base 11 and its extremity 16 opens below the seat 13 which is formed in the cylinderr 12. The conveying duct 15, the axis of which is at right angles to that of the cylinder 12, has a gradient such that the beads received at 16 move under gravity as far as its other extremity 17. As can be seen in FIG. 4, this extremity 17 is closed by a plug 18 and the duct is formed with an orifice 19 for discharging beads. The duct is aligned with the bit 4 and the orifice 19 is located a short distance from the plug 18. The diameter of the orifice 19 is at least equal to that of the beads used.

A vent 20 of a diameter smaller than that of the beads used may be formed diametrically opposite to this orifice 19, in the conveying duct 15. This vent allows discharge of the fumes released during the soldering operation and which have penetrated into the conveying duct 15 via the discharge orifice 19. It will be appreciated that, during continuous use of this soldering apparatus, the fumes could, by accumulating within the conveying duct 15, heat the duct to such an extent as would adversely affect the satisfactory operation of the soldering apparatus, which explains the presence of the vent 20.

A channel 21 opening into the opening 5 is formed longitudinally in the bit 4 of the soldering iron, below the bead discharge orifice 19. The width of this channel is at least equal to the diameter of the beads used; the depth of the channel is such that the beads will not jump out under normal operating conditions.

The opening 5 which is formed in the bit 4 is positioned a little before the working part 22 of the free extremity 6 of this bit. Its diameter is at least equal to that of the beads used.

Figure 5:
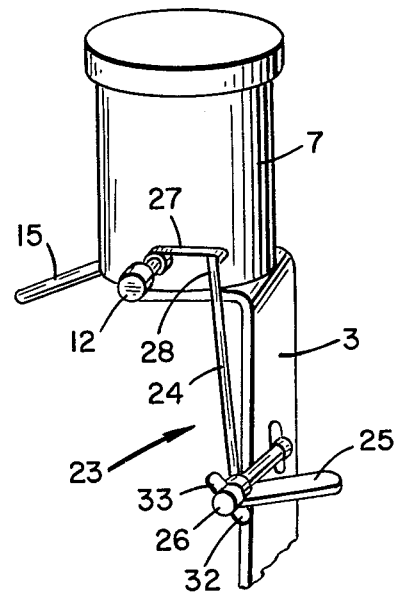
FIG. 5 is a perspective view showing the means for actuating the dispenser; and, FIG. 6 is a detail view showing the manner in which a spiral spring is fitted on the dispenser.
Figure 6:
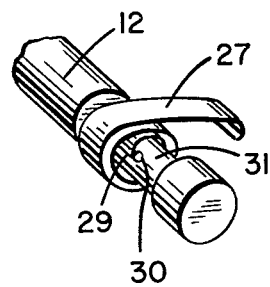

The means for actuating the cylinder 12 are illustrated in FIGS. 5 and 6. They comprise an angled release or trigger 23 comprising a long limb 24 and a short limb 25 which, between them, have a bend hinged on a spindle 26 which is mounted on the bearer 3. These means also comprise a spiral spring 27 coupled to a cylinder 12 around which it is wound and hooked to free extremity 28 of the long limb 24 of the trigger 23.

The spiral spring 27 has its end 29 engaged in a slot formed in a groove 31 in the outer portion of the cylinder 12.

The spindle 26 is provided with two stops 32 and 33 which, respectively, limit the displacements of the limbs 25 and 24 of the trigger 23.

The method of operation of this preferred soldering apparatus is the following. The magazine 7 being filed with beads, it is assumed that the seat 13 of the cylinder 12 is in the idle position. A bead occupies the seat 13 at this instant. By pressing on the short limb 25 of the trigger until that limb contacts the stop 32, the solderer causes the long limb 24 to pivot rearwardly and this unwinds the spiral spring 27. Thus, the cylinder 12 describes half a revolution; the seat 13 is thus positioned above the extremity 16 of the conveying duct 15 into which the extracted bead drops.

When the solderer releases his pressure on the short limb 25, the long limb 24 rocks forward and engages the stop 33 under the return action of the spiral spring 27 which is then wound around the cylinder 12. The trigger thus returns to its initial position, and another cycle may then be triggered.

The bead inserted at 16 into the conveying duct 15 traverses the latter under gravity, as far as the extremity 19, and impinges against the plug 18 from which it rebounds. By virtue of this rebound, the bead loses the greater proportion of its accumulated kinetic energy and rises a little again within the conveying duct, so as to drop into the channel 21 via the discharge orifice 19.

The bead then rolls as far as the opening 5 which it traverses in order to be positioned below the working portion 22 of the bit 4. The bead is preheated during its travel within the channel 21, but is not liquefied until it is under the working portion 22.

The device described above is installed on the barrel of a soldering iron by means of a bearer, but it will be obvious that other mountings may be employed.

The device in accordance with the invention is particularly appropriate for producing soldered joints on very closely set elements, for example the terminal lugs of a telephone relay, and soldered joints leaving the conductive wire visible at their centres may thus be produced. To avoid soldering two adjacent lugs together, the free extremity of the bit may be equipped with a flange which will keep the lugs spaced apart.

Those versed in the art will appreciate that the soldering apparatus in accordance with the invention allows precise dispensing of the quanity of metal applied at the instant of soldering, by virtue of the fact that these beads are distributed individually. Moreover, this precision may be increased by employing beads produced to close tolerances.

I claim:

1. An improved soldering device of the type for soldering by means of preformed solder shapes such as beads, the improvement comprising; a solder bit: an elongated dispenser including a magazine for said preformed solder shapes, an extractor for said preformed solder shapes arranged at the bottom of said magazine, means for actuating the extractor, and a conveying duct which opens at one end beneath said extractor and at the other end proximate the free end of said solder bit, wherein said solder bit is formed with a passageway extending entirely through said solder bit and extending transverse to the longitudinal axis of the solder bit and located proximate said free end and dimensioned to permit through passage of the preformed solder shapes and having formed therein a longitudinal groove which opens into said passageway and being of a width equal to the greatest dimension of said preformed solder shapes, wherein said conveying duct is formed in the shape of a tube with the end located proximate the passageway in said soldering bit being entirely plugged and said duct having an orifice for discharging said preformed solder shapes located proximate said plugged end and arranged above said longitudinal channel whereby upon release of a solder bead into the conveying duct the bead travels by gravity within the duct and impinges against the plug and rebounds into the orifice.

2. A soldering device according to claim 1, in which said extractor comprises a cylinder which is at the base of said magazine and which comprises a seat arranged to receive a predetermined quantity of preformed solder shapes and movable on its axis between an extraction position in which a predetermined quantity of preformed solder shapes occupies said seat, and a distribution position in which said quantity is delivered into said conveying duct.

3. A soldering device according to claim 2, in which said cylinder is formed with fins projecting into said magazine.

4. A soldering device according to claim 2, in which the axis of said cylinder is at right angles to that of said conveying duct.

5. A soldering device according to claim 1, in which said means for actuating said extractor comprise an angled trigger comprising a long limb and a short limb which between them have a bend hinged around a spindle mounted on the dispenser mounting, and a spiral spring coupled to said cylinder around which it is coiled and connected to the free extremity of the long limb of said trigger.

6. A soldering device according to claim 5, in which said spiral spring has one end engaged in a slot within a groove in the outer portion of said cylinder and is hooked at its other extremity on the free end of said long limb.

7. A soldering device according to claim 1, in which the end of said conveying duct situated close to the passageway in said soldering bit is plugged and said duct has a discharge orifice for preformed solder shapes situated a little before said plugged end and in alignment with the soldering bit.

8. A soldering device according to claim 1, in which said conveying duct is provided with a vent which is diametrically opposed to the said discharge orifice and which is smaller in size than that of the preformed solder shapes used.

* * * * *